United States Patent [19]
Seach

[11] Patent Number: 5,810,310
[45] Date of Patent: *Sep. 22, 1998

[54] HOLDER FOR EYEGLASSES

[76] Inventor: Eugene J. Seach, 2379 Henn-Hyde Rd. NE., Warren, Ohio 44484

[ * ] Notice: The term of this patent shall not extend beyond the expiration date of Pat. No. 5,613,661.

[21] Appl. No.: 772,598

[22] Filed: Dec. 23, 1996

Related U.S. Application Data

[63] Continuation-in-part of Ser. No. 519,116, Aug. 24, 1995, Pat. No. 5,613,661.
[51] Int. Cl.⁶ ..................................................... A57G 1/10
[52] U.S. Cl. ............................... 248/316.1; 24/33; 24/38; 248/902
[58] Field of Search ............................ 248/316.1, 309.1, 248/902, 316.4; 211/13.1; D6/266; 24/3.8, 3.3, 3.9

[56] References Cited

U.S. PATENT DOCUMENTS

| | | | |
|---|---|---|---|
| 4,239,167 | 12/1980 | Lane | 248/205.3 |
| 4,452,354 | 6/1984 | Tabachnick | 248/205.3 |
| 4,771,515 | 9/1988 | Guarro . | |
| 5,000,410 | 3/1991 | Beavers | 248/205.3 |
| 5,340,074 | 8/1994 | Porcaro et al. | 248/309.1 |
| 5,613,661 | 3/1997 | Seach | 248/902 X |
| 5,647,106 | 7/1997 | Hogan | 24/704.1 |

Primary Examiner—Ramon O. Ramirez
Attorney, Agent, or Firm—Harpman & Harpman

[57] ABSTRACT

An eyeglass holder for automobiles and the like to secure and hold eyeglasses in folded vertically aligned position engagement. The holder has a spring-urged engagement area accessible by depressing a portion of the holder. The engagement area receives and holds the eyeglasses between a fixed element and the movable access portion of the device.

4 Claims, 3 Drawing Sheets

HOLDER FOR EYEGLASSES

This is a CIP of allowed patent application Ser. No. 08/519,116, filed Aug. 24, 1995 now U.S. Pat. No. 5,613,661.

BACKGROUND OF THE INVENTION

1. Technical Field

This invention relates to eyeglass holders and the like used to temporarily hold and secure eyeglasses that will allow for quick and easy positioning and access to the glasses in vehicle environments where drivers attention should be directed to the road at all times.

2. Description of Prior Art

Prior art devices of this type have relied on a variety of different design configurations to hold eyeglasses for easy access. Typically, prior art eyeglass holders are inconvenient and while holding the eyeglasses must be placed somewhere within the vehicle making retrieval of the holder difficult given the limited storage space available to the driver while driving. Selected attempts to solve this problem in eyeglass storage in general can be seen in U.S. Pat. Nos. 5,340,074, 5,000,410, 4,771,512, 4,452,354 and 4,239,167.

In U.S. Pat. No. 5,340,047 an eyeglass display case is disclosed that is directed to holding and displaying glasses for retail sales. It illustrates an apertured panel through which the ear piece of the eyeglass is inserted.

U.S. Pat. No. 5,000,410 shows an eyeglass holder for automobiles that has an animal configuration with an extended fold over flap that engages the ear pieces of the eyeglass and graphically represents an animals tail.

U.S. Pat. No. 4,771,515 claims an eyeglass pocket insert holder that secures the eyeglasses within a shirt pocket.

An eyeglass holder is illustrated in U.S. Pat. No. 4,452,354 that provides a tubular sleeve of flexible plastic material through which the eyeglass ear piece is inserted.

In U.S. Pat. No. 4,239,167 a wall mounted eyeglass holder is shown wherein a bracket is formed out of a body panel to receive and suspend the glasses therein.

Finally, in U.S. Pat. No. 3,148,812 a holder for spectacles is illustrated that forms a folded loop about the eyeglass positioned therethrough.

SUMMARY OF THE INVENTION

A holder for eyeglasses that is secured within the dash or other suitable areas of an automobile that can be easily accessible by the driver or passenger during operation. The holder of the invention secures the eyeglasses in folded vertically aligned position by resiliently engaging a portion of the ear piece by a spring-urged element.

DESCRIPTION OF THE PREFERRED EMBODIMENT

Figure 1:
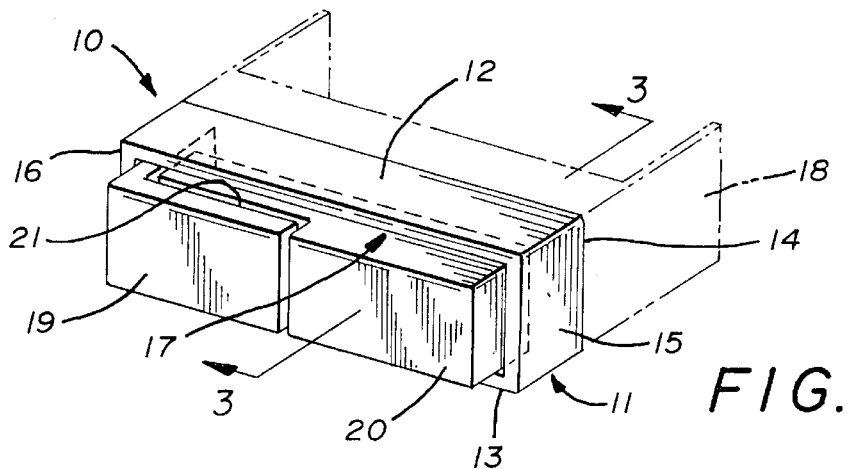
FIG. 1 is a perspective view of the eyeglass holder of the invention.

Referring to the drawings specifically FIGS. 1–4 a holder 10 for eyeglasses can be seen for recess placement within automobile dashboards (not shown). The holder 10 has a generally rectangular three-sided mounting enclosure 11 defining a top 12, a bottom 13, back portion 14 and integrally oppositely disposed end walls 15 and 16 defining an engagement opening. The mounting enclosure 11 has an auxiliary mounting bracket 18 shown in broken lines in FIG. 1 of the drawings as an example of alternate mounting configurations to an enclosed or recessed holder disclosed herein.

An eyeglass engagement body member 19 extends from the mounting enclosure 11 in spaced relation to the engagement opening 17. A movable engagement and access button element is of a generally rectangular configuration having an elongated engagement notch 21 therein. The access button 20 is positioned within the opening 17 adjacent the eyeglass engagement body member 19 overlying the notch portion 21 as best seen in FIG. 2 of the drawings.

The access button 20 has pairs of spaced spring registration and retaining lugs 22 and 23 extending therefrom facing said back portion 14. Pairs of springs 24 and 25 are registerably positioned on said lug pairs 22 and 23 and spring retaining fasteners F extending through the back portion 14 as best seen in FIGS. 2 and 3 of the drawings.

Figure 2:
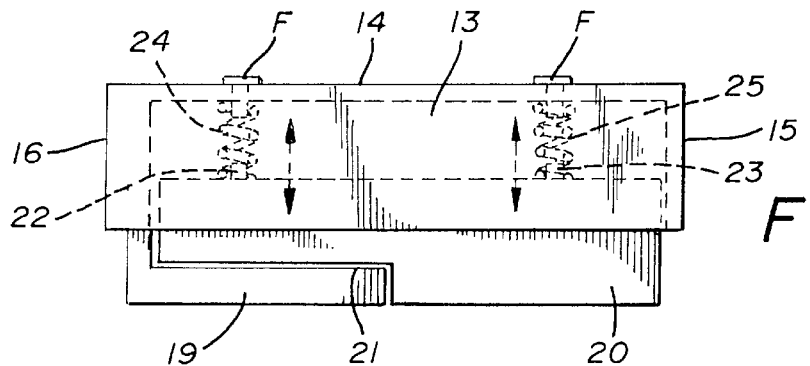
FIG. 2 is a top plan view of the eyeglass holder.
Figure 3:
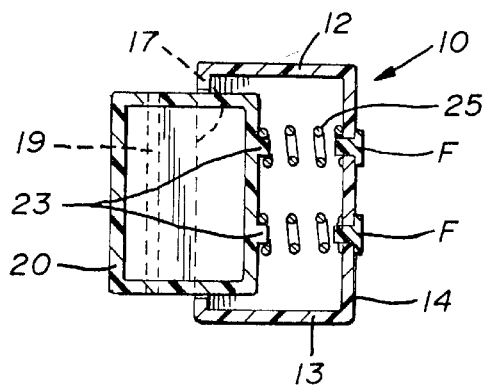
FIG. 3 is cross-section on lines 3—3 of FIG. 1.
Figure 4:
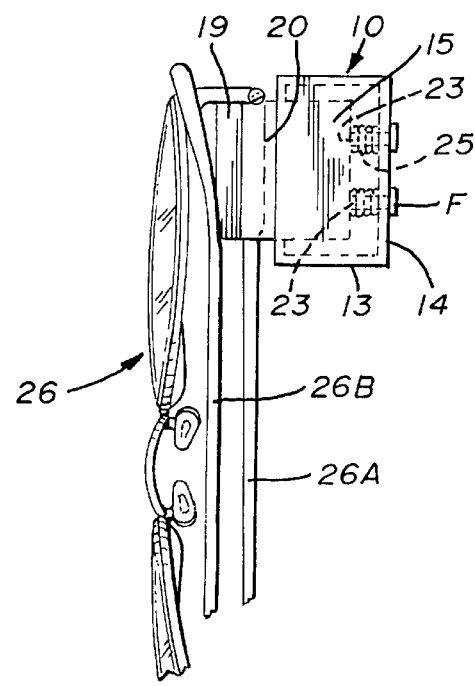
FIG. 4 is a side elevational view of the eyeglass holder with the eyeglass portion positioned within.

It will be evident from the above description that to facilitate a pair of eyeglasses 26 having temple portions 26A and B as seen in FIG. 4 of the drawings that the access button 20 is depressed inwardly into the enclosure 11 as indicated by directional arrows in FIG. 2 of the drawings. Once the button 20 is depressed the eyeglass temple 26A can be positioned over the engagement body member 19 with the notched portion 21 of the access button 20 resiliently engaging thereagainst holding the eyeglass in vertically aligned position as seen in FIG. 4 of the drawings.

Figure 5:
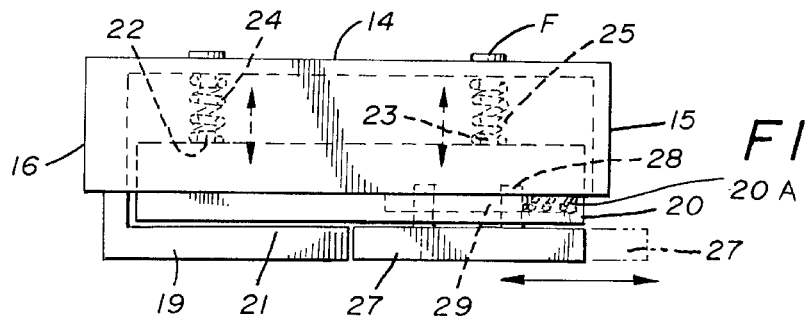
FIG. 5 is a top plan view of an alternate form of the eyeglass holder shown in FIGS. 1–4.

Referring now to FIG. 5 of the drawings an alternate form of the invention is illustrated wherein a portion 27 of the button 20 is in longitudinal alignment with the element 19, can be movable disposed laterally therefrom. The portion 27 has a pair of guides 28 extending therefrom registerably positioned in a slotted guide opening 29 with a spring 20A in the remaining portion of the engagement button 20. This alternate form of the invention allows for removal of the eyeglasses 26 without depressing the button 20 as hereinbefore disclosed by simply sliding the movable portion 27 laterally as indicated by the directional area away from the fixed body member 19. The eyeglasses 26 can be inserted between and held therein as hereinbefore described.

Figure 6:
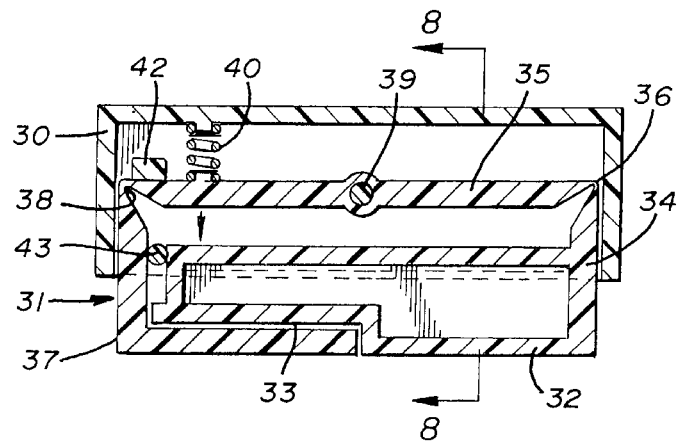
FIG. 6 is a sectional view of a second alternate form of the invention shown in FIGS. 1–4.
Figure 7:
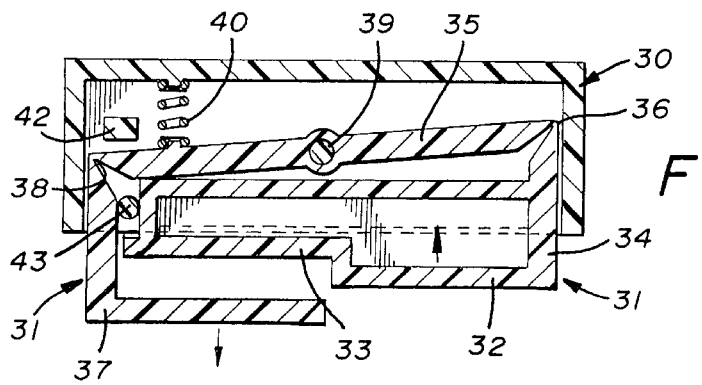
FIG. 7 is a sectional view of the second alternate form of the invention in use.
Figure 8:
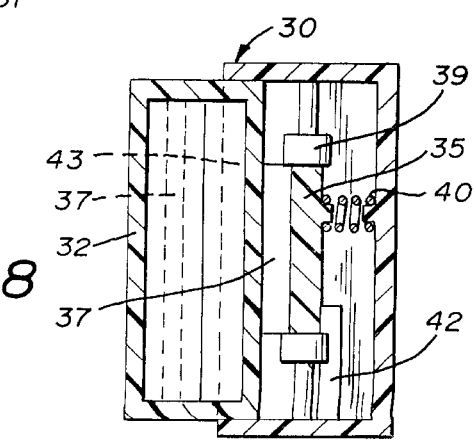
FIG. 8 is a cross-section on lines 8—8 of FIG. 6.

Referring now to FIGS. 6, 7 and 8 of the drawings, a second alternate form of the invention is disclosed having a three-sided rectangular open enclosure 30 with a one-piece movable disposed eyeglass holding element 31 pivotally secured therein. The holding element 31 has a main engagement portion 32 defining a generally rectangular enclosure with a recessed area 33 inwardly from one end thereof. An activation flange 34 extends from one of the rectangular enclosure 30 opposite said recessed portion 33. The activation flange 34 is interconnected to a support and pivot portion 35 by a living hinge 36 formed therebetween. A return and eyeglass engagement portion 37 is interconnected by a second hinge 38 to the support and pivot flange portion 35 and extends outwardly from the enclosure in a right angular configuration overlapping the recessed area 33.

The support and pivot portion 35 is pivotally secured within the enclosure 30 by a pivot pin and mounting assembly 39 as best seen in FIG. 8 of the drawings. Spring element 40 extends from said support and pivot portion 35 resiliently interconnecting the enclosure 30 and pivot portion 35.

An engagement stop 42 limits the travel of the support and pivot portions 35 while guide element 43 provides lateral support to both the respective elements.

Referring now to FIG. 7 of the drawings, the alternate form of the invention can be seen in operation when upon movement of the rectangular enclosure 32 inwardly will force the support and pivot portion 35 to pivot about its pivot assembly 39 against the spring tension correspondingly and simultaneously extending the eyeglass engagement portion 37 outwardly. This combined movement of the engagement portion 32 and eyeglass engagement portion 37 provides access for the insertion of the eyeglasses (not shown) between the eyeglass engagement portion 37 and recessed area 33 thereon gripping same upon release of the engagement portion 32 by the user as best illustrated in FIG. 6 of the drawings.

Figure 9:
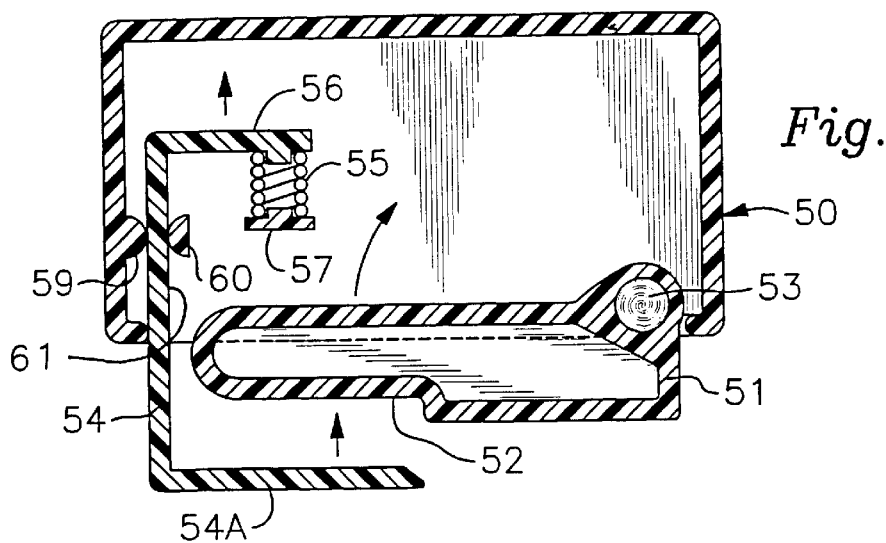
FIG. 9 is a sectional view of a third alternate form of the invention.

Referring to FIG. 9 of the drawings, a modified form of the invention can be seen having a three-sided rectangular open enclosure 50 with a pivoted engagement and access portion 51 having a recessed area 52 inwardly from one end thereof. The engagement portion 51 has an internal coil spring assembly 53 that resiliently urges the engagement portion 51 from the enclosure. A return and eye glass engagement portion 54 extends from the enclosure with a portion 54A overlying the recessed area 52 having an independent spring means 55 engageable on an arm 56 and a spring stop 57, best seen in FIG. 9 of the drawings. A pair of guides 59 and 60 are interengageable on a portion of the arm 54 in use, the modified form of the invention illustrated in FIGS. 9 and 10 shows the invention at rest in FIG. 10, wherein an eyeglass (not shown) can be inserted and held between access portion 51, recess area 52 and engagement portion 54 by a combination of spring-urged movement of both the portion 54A of the engagement portion 54 and the recess area 52 of the engagement portion 51.

For insertion of eyeglasses, deflection and movement of the engagement portion 51 is required to gain access while to remove eyeglasses, movement of the return and eyeglass engagement portion 54 is required as the eyeglasses are pulled out.

Figure 10:
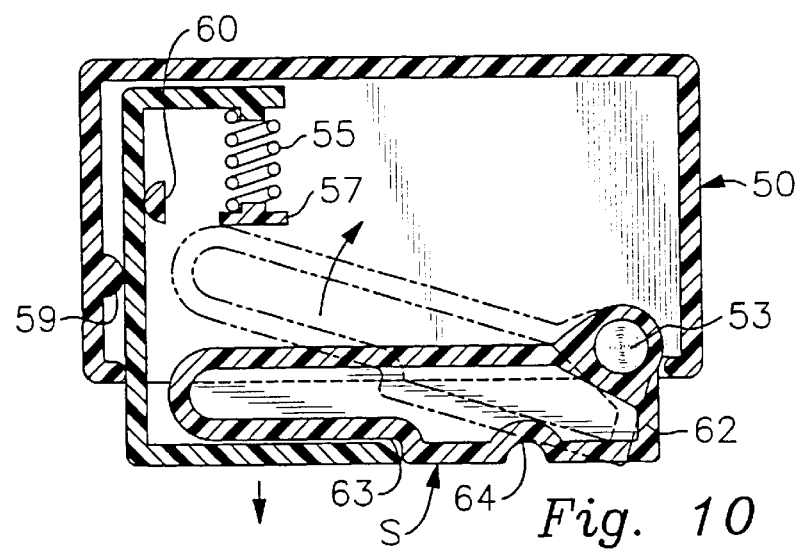
FIG. 10 is a sectional view of a modified form of the invention shown in FIG. 9.

Referring now to FIG. 10 of the drawings, a modified form of the invention set forth in FIG. 9 is shown wherein a pivoted engagement and access portion 62 can be seen having a reduced area of recess at 63 and a visualization proportional groove 64 therein so as to provide an equal dimension surface S visually to the user (not shown).

Figure 11:
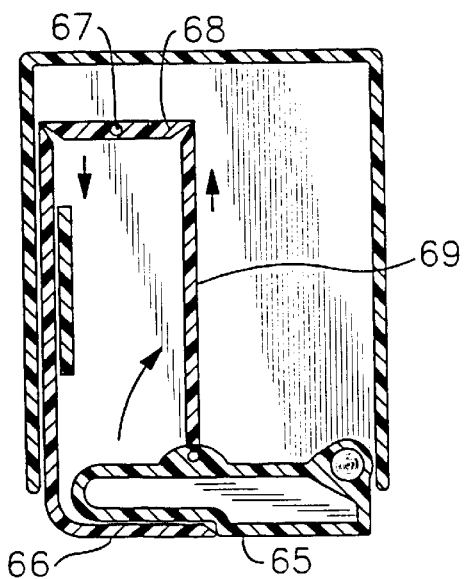
FIG. 11 is a sectional view of a hinged configuration of the alternate form as seen in FIG. 9.

Referring now to FIG. 11 of the drawings, a spring urged interconnected engagement and access portion 65 and return eye glass engagement portion 66 can be seen, wherein a secondary pivot point 67 and connection arm 68 are used to transfer the relative motion of the pivoted access portion 65 to the engagement portion 66 via an interconnecting link 69 extending from a pivot fitting 10 on the access portion 65 to the connection arm 68 as hereinbefore described.

It will be evident that as the engagement and access portion 65 is retracted within the enclosure that correspondingly the interconnected eye glass engagement portion 66 will be extended outwardly as indicated by directional arrows.

It will be evident from the above description both the preferred embodiment and alternate form of the invention's illustrated provide a frictional gripping co-efficient on the temple portion 26 of the affected eyeglasses, holding same in a secured easily available fashion as hereinbefore described.

It will thus be apparent to those skilled in the art that various changes and modifications may be made therein without departing from the spirit of the invention, therefore I claim:

1. An eyeglass holder for supporting a pair of eyeglasses in a removably secured relation therein comprises; an enclosure having an opening therein, access element movable positioned within said enclosure, an eyeglass engagement body member extending from said opening in the enclosure in spaced overlapping relation to a portion of said access element, a coiled spring within said access element for resiliently positioning said access element within said enclosure, spring means in communication with said eyeglass engagement body member, guide means within said enclosure engageable on said eyeglass engagement body member, said engagement body member and said movable access element together surrounding an ear piece of said pair of eyeglasses.

2. The eyeglass holder of claim 1 wherein said access element is positioned partially within said enclosure and has a reduced recessed area in said access element and a groove therein proportional to said recessed area, said recessed area in spaced relation to said eyeglass engagement body member.

3. An eyeglass holder for supporting a pair of eyeglasses in a removably secured relation therein comprises; an enclosure having an opening therein, access element movably positioned within said enclosure, an eyeglass engagement body member extending from said opening in the enclosure in spaced overlapping relation to a portion of said access element, a coil spring within said access element for resiliently positioning said access element within said enclosure, said eyeglass engagement body member and said movable access element interconnected by a pivot arm and interengagement link, guide means in said enclosure engageable on a portion of said movable access element.

4. The eyeglass holder set forth in claim 3 wherein said interengagement link is pivotally secured to said access element.

\* \* \* \* \*

UNITED STATES PATENT AND TRADEMARK OFFICE
CERTIFICATE OF CORRECTION

PATENT NO. : 5,810,310
DATED : September 22, 1998
INVENTOR(S) : Eugene Seach

It is certified that error appears in the above-identified patent and that said Letters Patent is hereby corrected as shown below:

Column 1, line 24 delete "4,771,512" and insert ---4,771,515--- in place thereof.

Column 1, line 24 after "4,239,167" insert ---and 3,148,812---.

Signed and Sealed this

Fourth Day of May, 1999

Q. TODD DICKINSON

*Attest:*

*Attesting Officer*     *Acting Commissioner of Patents and Trademarks*